United States Patent [19]
Baigas, Jr.

[11] Patent Number: 5,776,380
[45] Date of Patent: Jul. 7, 1998

[54] CHEMICAL AND MICROBIOLOGICAL RESISTANT EVAPORATIVE COOLER MEDIA AND PROCESSES FOR MAKING THE SAME

[75] Inventor: Joseph Fredrick Baigas, Jr., Charlotte, N.C.

[73] Assignee: Kem-Wove Incorporated, Charlotte, N.C.

[21] Appl. No.: 751,222

[22] Filed: Nov. 15, 1996

[51] Int. Cl.⁶ .................................................. B01F 3/04
[52] U.S. Cl. ........................... 261/107; 442/411; 428/297
[58] Field of Search ................................. 261/106, 107; 442/411; 428/297

[56] References Cited

U.S. PATENT DOCUMENTS

| | | |
|---|---|---|
| 912,310 | 2/1909 | Guttmann. |
| 2,490,079 | 12/1949 | Melvill. |
| 2,955,064 | 10/1960 | Frohmader. |
| 3,171,820 | 3/1965 | Volz. |
| 3,304,069 | 2/1967 | Palmer, Sr.. |
| 3,311,356 | 3/1967 | Eckert. |
| 3,322,405 | 5/1967 | Knudson et al. ............. 261/106 |
| 3,410,057 | 11/1968 | Lerner. |
| 3,796,657 | 3/1974 | Pretorius et al.. |
| 4,208,284 | 6/1980 | Pretorius et al.. |
| 4,333,893 | 6/1982 | Clyde. |
| 4,556,521 | 12/1985 | Baigas, Jr.. |
| 4,668,562 | 5/1987 | Street ........................... 442/411 |
| 4,902,449 | 2/1990 | Hobbs. |
| 4,904,522 | 2/1990 | Markusch. |
| 5,063,000 | 11/1991 | Mix. |
| 5,194,231 | 3/1993 | Gough et al.. |
| 5,216,790 | 6/1993 | Eschenbach ................... 442/411 |
| 5,275,859 | 1/1994 | Phillips et al.. |
| 5,304,423 | 4/1994 | Niknafs et al.. |
| 5,340,651 | 8/1994 | Esu. |
| 5,346,422 | 9/1994 | Bagrodia et al.. |
| 5,356,704 | 10/1994 | Phillips et al.. |
| 5,462,793 | 10/1995 | Isoda et al. ................... 442/411 |

FOREIGN PATENT DOCUMENTS

| | | |
|---|---|---|
| 0 536 308 B1 | 2/1994 | European Pat. Off.. |
| 0 466 778 B1 | 8/1994 | European Pat. Off.. |
| WO 93/02235 | 2/1993 | WIPO. |

OTHER PUBLICATIONS

W. Haile and B. Phillips. "New Deep Grooved Polyester Fiber." *New Nonwovens World*, Winter, 1994.

*Primary Examiner*—Tim R. Miles
*Attorney, Agent, or Firm*—Bell Seltzer Intellectual Property Law Group of Alston & Bird LLP

[57] ABSTRACT

An evaporative cooler pad includes a high loft body of synthetic staple fibers having a plurality of channels extending along the longitudinal axis thereof. The open nature of the pad allows air to flow freely through the pad, while the longitudinal channels serve to wick water contacting the pad throughout the pad, thus optimizing the cooling efficiency of the pad.

30 Claims, 1 Drawing Sheet

5,776,380

1

CHEMICAL AND MICROBIOLOGICAL RESISTANT EVAPORATIVE COOLER MEDIA AND PROCESSES FOR MAKING THE SAME

FIELD OF THE INVENTION

This invention relates generally to a device for cooling low humidity air through liquid evaporation, and more particularly to chemical and biological resistant evaporative pads for use in such a device and the method of manufacturing such pads.

BACKGROUND OF THE INVENTION

Application of the principle of humidification or liquid evaporation to accomplish cooling of air has been utilized frequently in the past. Through it, air at uncomfortably high temperatures, usually in excess of 90° F., and with a relative low relative humidity, can be cooled to a comfortable temperature without the need of condenser type air conditioning apparatus with its attendant high energy requirements. Accordingly, this principle has been widely used for air cooling in those arid areas of the world which typically have high temperatures and low humidities.

An evaporative cooling system typically consists of a high volume blower or fan driven by an electric motor, a water distribution system, and cooler pads which are contacted by air and water, the pads providing the surface area whereon the evaporation of the water occurs. In the past, these pads have typically utilized aspen wood excelsior as the material for adsorbing and absorbing the water and serving as the media on which evaporation takes place. While this material, at least when new, has proven to be a relatively good material on which to carry out the water evaporation process, it nonetheless has exhibited a number of undesirable characteristics.

For example, these wood shavings, by being organic and having a relatively high sugar content, have proven to be effective breeding grounds for various types of bacteria and molds carried by the air. This has resulted in coolers containing such pads soon giving off very objectionable swamp-like odors, and for this reason, coolers employing aspen excelsior have often been called "swamp coolers." Indeed, as this bacterial action continues on the shavings, the shavings are literally consumed and rendered worthless.

Other constructions using synthetic materials to form the evaporative cooler pads have been proposed. However, such pads must be treated to render the synthetic fibers hydrophilic because synthetic fibers, such as polyester fibers, are inherently hydrophobic.

In addition, it can be difficult to provide a pad formed of a synthetic material which is sufficiently porous to provide adequate reaction surface. For example, it has been suggested to substitute porous polyurethane materials for wood shavings in certain evaporative cooler pads. Such plastic material does eliminate the mold build-up problem to a degree (not being an organic vegetable material like wood), but the plastic still presents problems of its own in operation, in that the moving air does not readily pass through the polyurethane, and the water contacting the polyurethane pad is usually not uniformly distributed therein. Also, foam materials of this type can have poor resistance to alkalinity and chlorine and fluorine, all of which are particularly present in the waters of the arid areas in which evaporative coolers are most typically used. These deficiencies substantially detract from the operating efficiency and the usefulness of such pads.

2

U.S. Pat. No. 5,340,651 to Esu describes an evaporative cooler media formed of hydrophilic glass fibers. The glass fibers are coated with a blend of an amine-aldehyde compound with an acrylic to render the fibers hydrophilic.

U.S. Pat. No. 4,556,521 to Baigas, Jr. discloses a high loft batt of hydrophobic textile fibers such as polyester fibers, which are prebonded together and then coated with a preformed hydrophilic foam which coats the bonded synthetic fibers and bridges and spans random portions of the interstices and passageways of the batt to increase the available surface area for contact by water.

U.S. Pat. No. 4,902,449 to Hobbs discloses an evaporative cooler pad formed by natural cellulosic fibers treated with a preformed hydrophilic foam.

SUMMARY OF THE INVENTION

The foregoing shortcomings and deficiencies are met by the present invention which relates generally to a device for cooling low humidity air through liquid evaporation. This device is characterized by having an evaporative cooler pad with a high loft body of synthetic staple fibers. The staple fibers are separated from one another along the greater part of their respective lengths and form interconnecting interstices and passageways throughout the body. Accordingly, air directed toward the pad can flow generally freely throughout the pad in all directions.

The staple fibers have a cross sectional configuration which increases the available surface area of the pad for contact of fluid, i.e., water, with air flowing through the pad. The cross sectional configuration of the staple fibers also provides improved wicking and liquid transport properties to the fibers, i.e., can render the fibers hydrophilic even when the fibers are formed of a hydrophobic polymer. Thus the fibers are capable of spontaneously transporting water on the surface thereof so that when the pad is contacted with water, the fibers wick the water along the surfaces thereof. This in turn optimizes the relative cooling efficiency of the pad.

Preferably, the cross sectional configuration of the staple fibers is highly irregular. More preferably, the staple fibers of the pad of the invention include a plurality of axially extending lobes or projections, forming a plurality of channels which extend along the longitudinal axis of the fibers. This configuration substantially increases the available surface area of the pad. Further, the channels produce a capillary type effect when contacted by water so that when the pad is contacted with fluid, the pad wicks the fluid along the channels.

In a particularly preferred embodiment of the invention, the evaporative pad further includes a plurality of randomly oriented thermally activatable binder fibers. At least a portion of the binder fibers are thermally activated to bind the staple fibers to form a coherent, substantially unitary structure.

Advantageously, the staple fibers include a hydrophilic finish on the surface thereof to further increase the liquid transport and cooling efficiencies of the pad. When present the binder fibers can also advantageously include a hydrophilic finish on the surface.

The evaporative cooler pad of the invention provides a relatively high cooling efficiency while being simple to construct and inexpensive. The cooler pad is also reusable in that it can be readily cleaned, if contaminated by water and air impurities, and has a relatively long service life. Further, the pad does not promote mold and decay and thus does not add unpleasant odors to the air being cooled by the cooler. Furthermore, the constituents of the pad are nontoxic and

3 noninjurious to life so that the pad may be safely used to cool air in dwellings.

BRIEF DESCRIPTION OF THE DRAWINGS

Some of the objects and features of the invention having been stated, others will become more apparent as the description proceeds, when taken in connection with the accompanying drawings in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate art may modify the invention here described while still achieving the favorable results of this invention. Accordingly, the description which follows is to be understood as being a broad teaching disclosure directed to persons of skill in the appropriate art and not as limiting upon the present invention.

Figure 1:
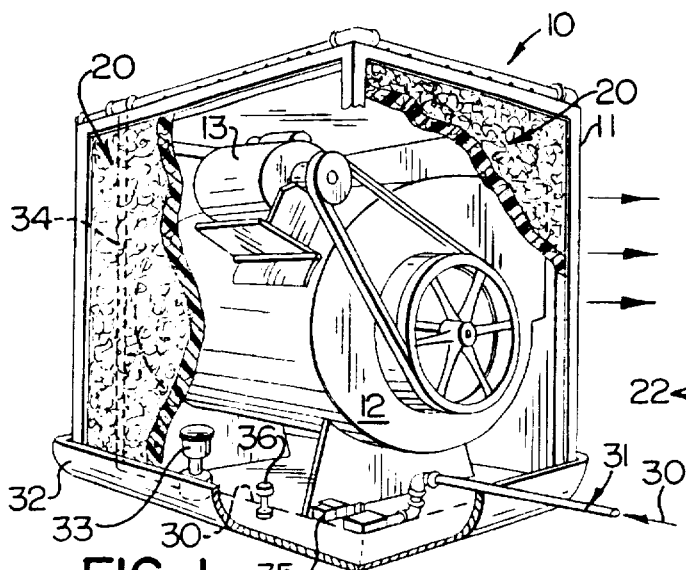
FIG. 1 is a perspective view in environmental setting of the evaporative cooler of the invention.

Referring now to FIG. 1, an evaporative cooler device 10 in accordance with the invention is shown along with its basic components. These basic components, other than the cooler pad, are for the most part conventional and include an enclosure 11 which contains a relatively high volume, low speed fan or blower 12 driven by an electric motor 13.

The enclosure 11 is generally exposed to the air to be treated. Although not shown, three of the four side walls of the enclosure 11 are typically provided with openings such as louvers or perforations to permit air to flow into the enclosure in response to the action of the blower 12. Air to be cooled passes from the exterior to the interior of the enclosure 11. In doing so, it passes through the evaporative cooler pads 20 which are installed on the side walls provided with openings. These cooler pads 20 may be of whatever size is desired so that they may be installed on a wall in plural number or large enough for one pad to cover an entire enclosure wall. Cooling of the air passing through the cooler device 10 is accomplished by feeding water 30 through the cooler pads 20 while at the same time operating the blower 12 to pull air through the cooler pads 20. Thus, while the air is passing through the pads 20, liquid water 30 is being vaporized therein. This results in the temperature of the air being lowered, and its relative humidity being raised. The cooled air is then moved by the blower 12 into the area being cooled (not shown).

The water 30 is supplied to the cooler pads 20 by a water distribution system 31. The water distribution system 31 desirably comprises a water tank 32 in the bottom of enclosure 11, a water recirculating pump 33 mounted in the water tank 32, a water line 34 passing from the pump 33 to the upper portion of the enclosure 11 leading to water outlets (not shown). In operation, the pump 33 drives the water 30 from the outlets at a predetermined rate. As the water 30 passes through the pads 20, a portion of it is vaporized and is carried off with the air passing through the cooler 10. That water which is not vaporized and carried off with the air and which does not remain in the pads 20 drips down into the tank 32. The level of water 30 in the tank 32 is maintained at a predetermined level. If it drops below that level, a float valve 35 is actuated to introduce additional water 30 to the water tank 32 from an external source (not shown). If the level of water 30 in the tank 32 rises above the predetermined level, it is carried off by a water overflow pipe and drain 36.

Figure 2:
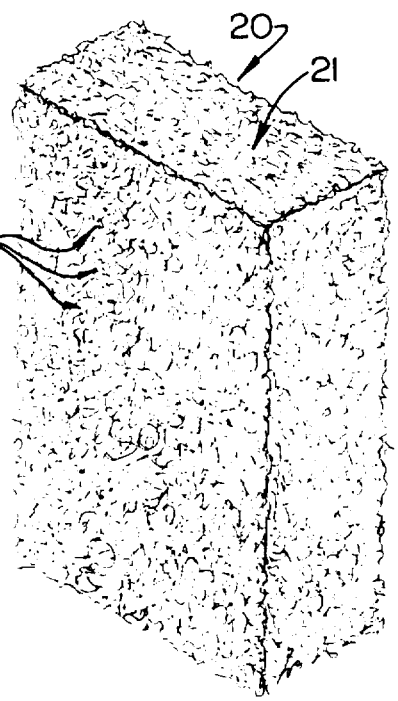
FIG. 2 is an enlarged partial sectional view of the evaporative cooler pad of the invention.

Referring now to the pad 20 and to FIG. 2, the pad 20 comprises a body 21 of randomly oriented synthetic staple fibers 22. These fibers 22 are separated from one another along the greater part of their respective lengths, forming interconnecting interstices and passageways throughout the body 21 such that air directed toward the pad 20 may flow generally freely therethrough in all directions. The fibers 22 are preferably polyester fibers in deniers from about 1 to about 150, more preferably from about 5 to about 25, and having a length from about 1 inch to about 6 inches, more preferably from about 1 to about 3 inches. The fibers can be formed of other polymers as known in the art, such as polyolefins, polyamides, and the like. The pad 20 of the invention preferably also includes binder fibers, as described in more detail below.

The synthetic fibers of pad 20 of the invention are selected to have a surface configuration which increases the surface area of the fibers. Preferably, the measured surface area of the staple fibers is at least about two times the surface area of fibers having a round cross section and of the same denier. The surface configuration is also selected so as to provide improved liquid transport of a liquid contacted to the fibers, such as water in the evaporative coolers of the invention. In a preferred embodiment of the invention, the staple fibers have a highly irregular cross-sectional configuration as taken perpendicular to the longitudinal axis of the fiber. An exemplary fiber configuration is best illustrated in FIG. 3, a greatly enlarged cross-sectional view of an exemplary fiber component of the evaporative cooler pad of the invention.

Figure 3:
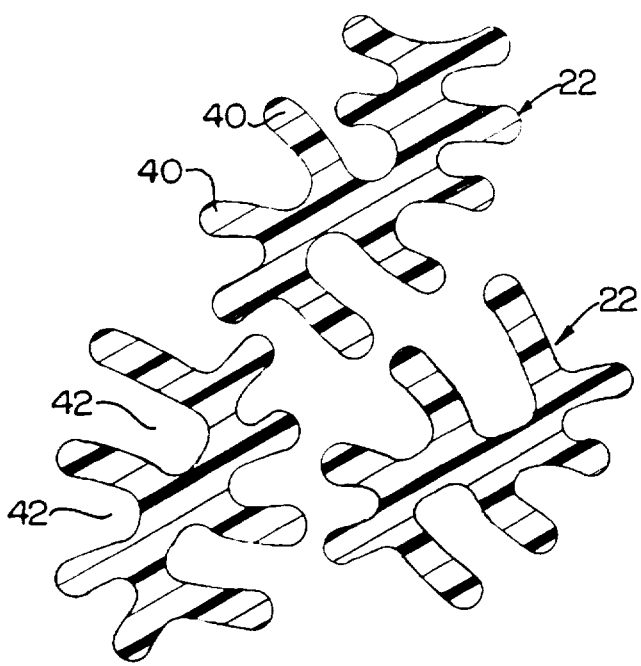
FIG. 3 is a greatly enlarged cross-sectional view of an exemplary fiber component of the evaporative cooler pad of the invention.

As illustrated in FIG. 3, preferred fibers include a plurality of peaks or "lobes" 40 extending radially outwardly from the axis of the fibers to form a plurality of grooves or channels 42 extending along the longitudinal axis thereof. The staple fibers can have at least about four radial projections, or more.

The multi-lobed cross-sectional configuration creates substantially increased surface area in the body 21 so that the available surface area of the pad 20 for contact by water is accordingly increased. Further, the multi-lobed structure produces a capillary type effect when contacted by water. Thus, when the pad 20 of the invention is contacted by water in use, the grooves along the longitudinal axis of the multi-lobed fibers serve to wick the water along the fibers of pad 20 to substantially increase the surface area of the pad 20 contacted by the water when the air is flowing through the pad 20. This optimizes the relative cooling efficiency of the pad 20 through maximum utilization of the pad 20 for water evaporation. Thus, the staple fibers exhibit hydrophilic properties, even when the staple fibers are formed of a polymer which is inherently hydrophobic.

An exemplary fiber for use in the pads of the invention is a polyethylene terephthalate fiber available from Eastman Chemical Company under the designation 4DG.

In an especially preferred embodiment of the invention the staple fibers include a hydrophilic coating or finish on the surface thereof to increase the liquid transport and cooling efficiencies of the pad. Any of the various types of hydrophilic finishes for fibers can be used. The amount of hydrophilic agent applied to the staple fibers can vary, depending upon the specific desired end properties of the pad (such as the degree of wettability), and can be readily determined by the skilled artisan.

Pad 20 can further include one or more types of binder fibers as known in the art to thermally bond the web into a coherent structure. Binder fibers are known in the art and include fibers made from low melting polyolefins such as polyethylenes and polypropylenes, polyamides and copolyamides, polyesters and copolyesters, acrylics and the like. Binder fibers also include bicomponent and multicomponent fibers such as sheath/core, side-by-side, sectorized or similar bicomponent fibers wherein at least one component of the fiber is a low melting material such as a polyethylene, a polyester, a copolyester, a polyamide, a copolyamide, and the like. Such fibers include polyethylene/polypropylene and polyethylene/polyester sheath/core fibers and copolyester/polyester sheath/core fibers. Preferably, the binder fibers include a hydrophilic finish on the surface thereof as known in the art, such as that described in more detail above.

The binder fibers can have a denier ranging from about 1 to about 30, preferably from about 3 to about 15, and a length from about 1 to 6 inches, preferably from about 1 to about 3 inches.

The content of the binder fibers in the pad is selected to provide the desired end properties thereto and can be adjusted accordingly. In this regard, the content of the binder fibers is sufficient to bond the staple fibers together to stabilize the body 21 and to form a coherent unitary pad 20. The content of the binder fibers can also be adjusted so that the air flow and liquid transport properties of the pad 20 are not substantially impaired or compromised.

For example, in applications requiring an increased degree of bond integrity, and in which a diminishment of air flow can be tolerated, the content of binder fibers can be increased. In contrast, for applications requiring increased air permeability, the binder fiber content can be decreased. Accordingly, the content of binder fibers can be selected to provide the desired integrity and porosity to the pads of the invention. The binder fibers are preferably present in the web in an amount between about 15 and 35 percent by weight, and more preferably between about 20 and 30 percent by weight.

Bonding conditions, such as bonding temperatures, pressures, residence time, etc., can also be selected to impart the desired degree of integrity, porosity, and the like to the pad, and are well known to the skilled artisan for different polymers.

Figure 4:
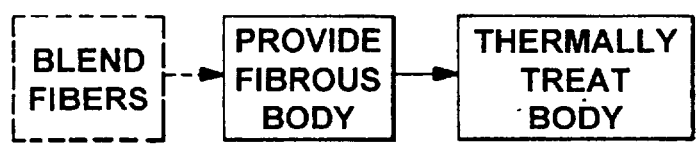
FIG. 4 is a schematic diagram of a method of manufacturing the evaporative cooler pad of the invention.

With regard to the manufacture of the pad 20, the preferred basic steps are shown in FIG. 4. The first step is to provide a high loft body of intersecting synthetic staple fibers 22. This step may employ carding, air laying, garnetting, wet laying, cross lapping, and similar processes known in the art. As indicated in phantom in FIG. 4, optionally, binder fibers are mixed with the staple fibers prior to forming the body 21.

The next step is thermally treating the body 21 sufficiently to bond the fibers 22 to one another (or to one another and to a plurality of binder fibers, when present) to form the desired bonded cooler pad material. Conventional thermal treatment apparatus can be used. The operating temperature of the thermal treatment apparatus should be adjusted to a temperature such that the staple and/or binder fibers are thermally activated to bond the web into a coherent, unitary structure.

Thermal treatment conditions can be adjusted to provide the desired end properties of the webs of the invention, i.e., thermal treatment temperatures can be adjusted to soften the fibers to greater or lesser degrees. For example, the web can be treated at temperatures sufficient to render the fibers soft and tacky so that they are able to adhere or bond together. Alternatively, the web can be treated at temperatures approaching the melting point of the polymer of the fibers so that the polymer not only softens but also flows to substantially fills the interstices of the web. Accordingly, the porosity of the resultant pad can also be adjusted by selection of an appropriate bond temperature.

The thermal treatment apparatus can be heated calender rolls, a through-air bonding oven, a microwave or other RF treatment zone, an ultrasonic welding station, and the like. Bonding conditions, including temperature and pressure, vary according to the particular polymer used and operating conditions and are known in the art for differing polymers.

The cooler pad of the invention can have a basis weight between about 1 and about 50 ounces per square yard ("osy").

The bonded cooler pad material may be retained in rolls or cut into slabs of desire size.

In one particular process of manufacture, polyester staple fibers (polyethylene terephthalate fibers available from Eastman Chemical Company under the designation 4DG) are provided with a hydrophilic finish. The polyester staple fibers are mixed using conventional techniques with binder fibers, also with a hydrophilic finish.

The staple/binder fibers are fed to a conventional carding machine to form a web having a basis weight from about 1 to 3 osy. This web can then be increased in basis weight using conventional cross lapping processes and equipment to form a web having a basis weight from about 6 to about 15 osy.

Thereafter, the web is thermally treated by directing the web into a through air oven set to a temperature sufficient to soften the binder fibers. The polymer flows into the interstices of the web and contacts and bonds the staple fibers together to form a cooler pad in accordance with the invention.

The cooler pad can be cooled following thermal treatment. Alternatively, the cooler pad can be treated to adjust the thickness of the web using conventional techniques prior to cooling the web. In this embodiment of the invention, the web is directed into a through air oven having a calibrating section, as known in the art. The calibrating section can, for example, include support screens or conveyers both above and below the web and contacting both surfaces thereof. The distance between each screen is adjusted to provide a gap therebetween of the desired thickness for the pad. In this example, the screens were adjusted to provide a gap of 1 inch, although larger or smaller gaps can be used.

In this position, cooling air is drawn through the web. This fixes the web thickness, for example, to one inch. Using this technique the cooler pads of the invention can be molded and set to provide a pad having the desired dimensions.

Application tests in evaporative cooler installations of the types shown in FIG. 1 have shown the pad of the invention to have a low pressure drop in air flow of a magnitude equal to or less than that of pads filled with fresh aspen shavings.

There is thus provided by this invention an evaporative cooler pad 20 which yields a relatively high cooling efficiency while being simple to construct and inexpensive. The cooler pad 20 is also reusable in that it can be readily cleaned. if contaminated by water and air impurities, and has a relatively long service life. Further, the pad does not promote mold and decay and thus does not add unpleasant odors to the air being cooled by the cooler. Furthermore, the constituents of the pad are nontoxic and noninjurious to life so that the pad may be safely used it cool air in dwellings.

In the drawings and specification, there has been set forth a preferred embodiment of the invention, and although specific terms are employed, they are used in a generic and descriptive sense only and not for purposes of limitation.

That which is claimed is:

1. An evaporative cooler comprising an enclosure, an evaporative cooler pad positioned within said enclosure, means for feeding water to the pad for flow through the pad, and a blower for moving air through the pad, said evaporative cooler pad comprising a body of randomly oriented synthetic staple fibers, said fibers being separated from one another along the greater part of their respective lengths and forming interconnecting interstices and passageways throughout the body such that air directed toward the pad can flow generally freely therethrough in all directions, said synthetic staple fibers having a plurality of projections radially extending from the axis thereof, said projections forming a plurality of channels extending along the longitudinal axis of the staple fibers to substantially increase the available surface area of the pad for contact of the water with the air flowing therethrough, said channels producing a capillary type effect when contacted by water whereby the pad upon being contacted with water wicks the water alone the channels to thereby optimize the relative cooling efficiency of the pad.

2. The evaporative cooler of claim 1, wherein said staple fibers have a surface area of at least about two times the surface area of a staple fiber of the same denier having a round cross sectional configuration.

3. The evaporative cooler of claim 1, wherein said staple fibers have at least about four radial projections.

4. The evaporative cooler of claim 1, wherein said pad is a carded web.

5. The evaporative cooler of claim 1, wherein said body of staple fibers further comprises a plurality of randomly oriented thermally activatable binder fibers, wherein at least a portion of said binder fibers are thermally activated to thereby bind said staple fibers to form a coherent, substantially unitary structure.

6. The evaporative cooler of claim 5, wherein said binder fibers comprise polypropylene.

7. The evaporative cooler of claim 5, wherein said binder fibers are bicomponent fibers.

8. The evaporative cooler of claim 5, wherein said binder fibers include a hydrophilic finish on the surface thereof.

9. The evaporative cooler of claim 5, wherein said binder fibers are present in said body of staple fibers in an amount between about 15 and 35 percent by weight.

10. The evaporative cooler of claim 9, wherein said binder fibers are present in said body of staple fibers in an amount between about 20 and 30 percent by weight.

11. The evaporative cooler of claim 1, wherein said staple fibers are formed of a hydrophobic polymer.

12. The evaporative cooler of claim 11, wherein said staple fibers are formed of a polymer selected from the group consisting of polyester, polyolefin, and polyamide fibers.

13. The evaporative cooler of claim 11, wherein said staple fibers include a hydrophilic finish on the surface thereof.

14. An evaporative cooler comprising an enclosure, an evaporative cooler pad positioned within said enclosure, means for feeding water to the pad for flow through the pad, and a blower for moving air through the pad, said evaporative cooler pad comprising a body of randomly oriented synthetic staple fibers, said fibers being separated from one another along the greater part of their respective lengths and forming interconnecting interstices and passageways throughout the body such that air directed toward the pad can flow generally freely therethrough in all directions, said synthetic staple fibers having a plurality of projections radially extending from the axis thereof, said projections forming a plurality of channels extending along the longitudinal axis thereof to substantially increase the available surface area of the pad for contact of the water with the air flowing therethrough, said channels producing a capillary type effect when contacted by water whereby the pad upon being contacted with water wicks the water along the channels to thereby optimize the relative cooling efficiency of the pad, said body of staple fibers further comprising a plurality of randomly oriented thermally activatable binder fibers, wherein at least a portion of said binder fibers are thermally activated to thereby bind said staple fibers to form a coherent, substantially unitary structure.

15. An evaporative cooler pad comprising a body of randomly oriented synthetic staple fibers, said fibers being separated from one another along the greater part of their respective lengths and forming interconnecting interstices and passageways throughout the body such that air directed toward the pad can flow generally freely therethrough in all directions, said synthetic staple fibers having a plurality of projections radially extending from the axis thereof, said projections forming a plurality of channels extending along the longitudinal axis thereof to substantially increase the available surface area of the pad for contact of water with the air flowing therethrough, said channels producing a capillary type effect when contacted by water whereby the pad upon being contacted with water wicks the water along the channels to thereby optimize the relative cooling efficiency of the pad, said body of staple fibers further comprising a plurality of randomly oriented thermally activatable binder fibers, wherein at least a portion of said binder fibers are thermally activated to thereby bind said staple fibers to form a coherent, substantially unitary structure.

16. An evaporative cooler pad comprising a body of randomly oriented synthetic staple fibers, said fibers being separated from one another along the greater part of their respective lengths and forming interconnecting interstices and passageways throughout the body such that air directed toward the pad can flow generally freely therethrough in all directions, said synthetic staple fibers having a plurality of projections radially extending from the axis thereof, said projections forming a plurality of channels extending along the longitudinal axis of the staple fibers to substantially increase the available surface area of the pad for contact of the water with the air flowing therethrough, said channels producing a capillary type effect when contacted by water whereby the pad upon being contacted with water wicks the water along the channels to thereby optimize the relative cooling efficiency of the pad.

17. The evaporative cooler pad of claim 16, wherein said staple fibers have a surface area of at least about two times the surface area of a staple fiber of the same denier having a round cross sectional configuration.

18. The evaporative cooler pad of claim 16, wherein said staple fibers have at least about four radial projections.

19. The evaporative cooler pad of claim 16, wherein said pad is a carded web.

20. The evaporative cooler pad of claim 16, wherein said body of staple fibers further comprises a plurality of randomly oriented thermally activatable binder fibers, wherein at least a portion of said binder fibers are thermally activated to thereby bind said staple fibers to form a coherent, substantially unitary structure.

21. The evaporative cooler pad of claim 20, wherein said binder fibers comprise polypropylene.

22. The evaporative cooler pad of claim 20, wherein said binder fibers are bicomponent fibers.

23. The evaporative cooler pad of claim 20, wherein said binder fibers include a hydrophilic finish on the surface thereof.

24. The evaporative cooler pad of claim 20, wherein said binder fibers are present in said body of staple fibers in an amount between about 15 and 35 percent by weight.

25. The evaporative cooler pad of claim 24, wherein said binder fibers are present in said body of staple fibers in an amount between about 20 and 30 percent by weight.

26. The evaporative cooler pad of claim 16, wherein said staple fibers are formed of a hydrophobic polymer.

27. The evaporative cooler pad of claim 26, wherein said staple fibers are formed of a polymer selected from the group consisting of polyester, polyolefin, and polyamide fibers.

28. The evaporative cooler pad of claim 26, wherein said staple fibers include a hydrophilic finish on the surface thereof.

29. A process for producing an evaporative cooler pad comprising the steps of:

forming a body of randomly oriented synthetic staple fibers and thermally activatable binder fibers, said fibers being separated from one another along the greater part of their respective lengths and forming interconnecting interstices and passageways throughout the body such that air directed toward the body can flow generally freely therethrough in all directions, said synthetic staple fibers having a plurality of projections radially extending from the axis thereof, said projections forming a plurality of channels extending along the longitudinal axis thereof to substantially increase the available surface area of the body for contact of water with the air flowing therethrough, said channels producing a capillary type effect when contacted by water whereby the body upon being contacted with water wicks the water along the channels to thereby optimize the relative cooling efficiency of the body; and thermally treating said body sufficiently to thermally activate at least a portion of said binder fibers to thereby thermally bond said staple fibers together to form a coherent, substantially unitary cooler pad structure.

30. The process according to claim 29, wherein said forming step comprising carding said staple fibers.

* * * * *